UNITED STATES PATENT OFFICE.

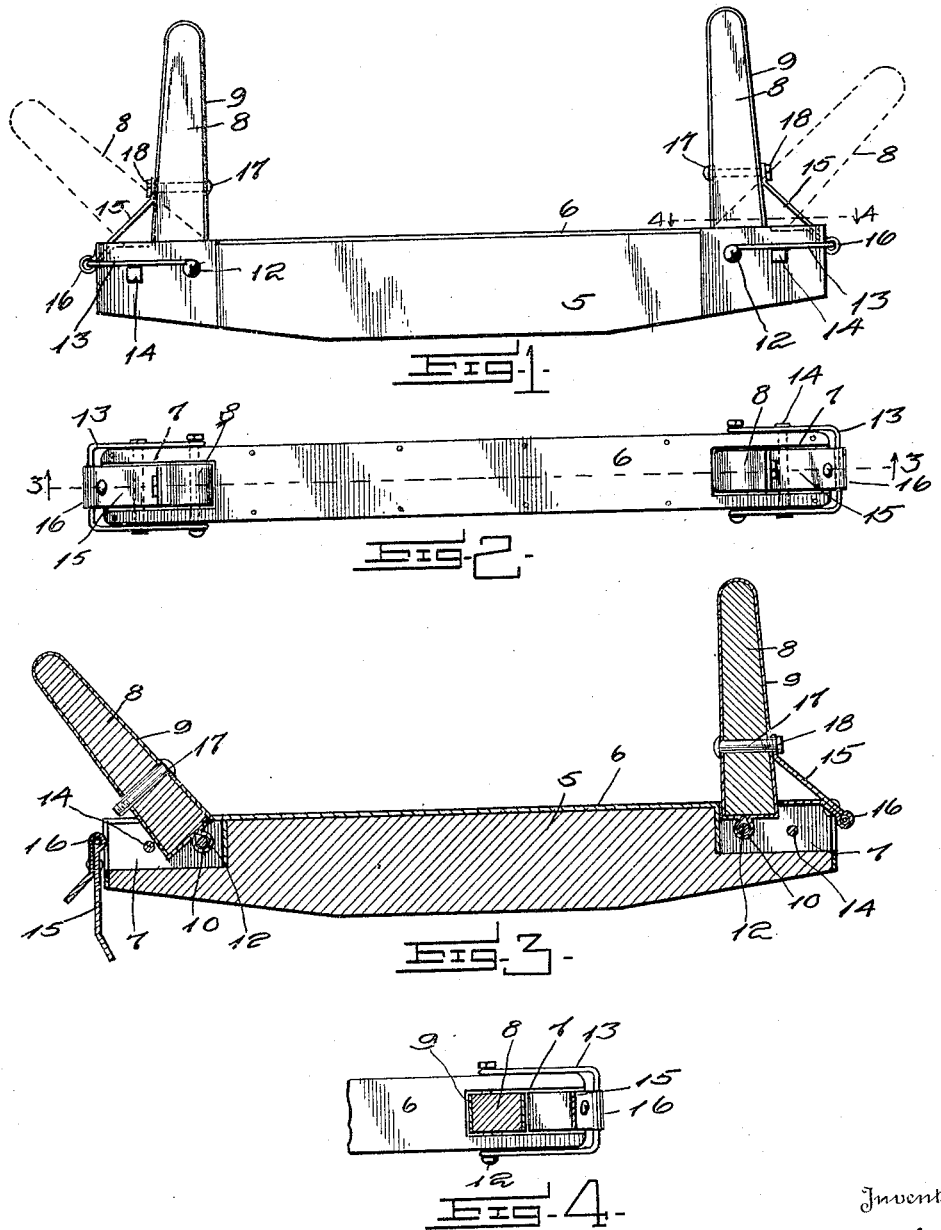

RICHARD R. COSTELLO, OF LOGANSPORT, INDIANA.

STANDARD FOR WAGONS.

1,123,249. Specification of Letters Patent. Patented Jan. 5, 1915.

Application filed April 4, 1914. Serial No. 829,520.

*To all whom it may concern:*

Be it known that I, RICHARD R. COSTELLO, a citizen of the United States, residing at Logansport, in the county of Cass and State of Indiana, have invented certain new and useful Improvements in Standards for Wagons, of which the following is a specification.

My invention relates to improvements in means for connecting the stakes or standards with the bolster of a wagon, so that the same may be angularly adjusted with relation to the bolster and removed therefrom without destruction or mutilation of the bolster.

The invention aims to provide means of the above-mentioned character, which is simple in construction, inexpensive to manufacture, strong, durable and convenient in use.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention. Fig. 2 is a plan view of the same. Fig. 3 is a longitudinal section taken on line 3—3 of Fig. 2, and Fig. 4 is a horizontal section taken on line 4—4 of Fig. 1.

In the drawings, wherein is illustrated a preferred embodiment of the invention, the numeral 5 designates a bolster of a wagon, the upper side of which is preferably covered by a strip of sheet-metal 6, rigidly secured thereto by any suitable means. This bolster is provided at its ends with openings 7, for a purpose to be described.

The numeral 8 designates stakes or standards having their lower ends extending into the openings 7, as shown. Each of these stakes is covered or bound by sheet-metal 9, secured thereto by suitable means. The sheet-metal 9 has a loop or eye 10 formed in the lower portion thereof, loosely receiving a transverse bolt 12. This bolt is removably mounted in the end of the bolster, whereby the stake or standard is pivotally and removably mounted upon said bolster.

Arranged upon each end of the bolster 5 is a U-shaped holding member 13, receiving the same and having its inner ends apertured to pivotally receive the movable bolt 12. This holding-member is adapted to be normally supported by a removable transverse bolt 14, arranged therebelow and passing through the opening 7, shown.

Pivotally mounted upon the outer or transverse end of the holding-member 13 is a relatively rigid diagonal brace 15, the material of which is bent upon itself to form an eye or loop 16, pivotally receiving the outer or transverse end of the holding-member 13, as shown. At its upper end the brace 15 is apertured, to receive the end of a bolt 17, passing through the stake or standard, and carrying a removable nut 18, as shown.

In the use of a wagon, particularly when the body is heavily loaded, it not infrequently happens that the body binds with or sticks to the stakes or standards, rendering it exceedingly difficult to remove the body from the bolsters. When this occurs, I remove the nuts 18 to disconnect the braces 15 from the stakes 8, subsequently to which the stakes are swung away from the wagon body, thus freeing the same. The stakes or standards may also be swung to occupy outer angular positions, for receiving therebetween racks having sides of different angular arrangement. These stakes may then be supported by the bolts 14, and if they are removed the stakes may be swung to the horizontal, where they are supported by the bottom walls of the openings 7. Should the stakes become broken they may be removed by removing the bolts 12 and the nuts 18, whereby others may be substituted in their place.

It is to be understood that the form of my invention herewith shown and described, is to be taken as a preferred embodiment of the same, and that various changes in the shape, size, and arrangement of parts may be resorted to without departing from the spirit of the invention or the scope of the subjoined claims.

Having described my invention, I claim:—

1. The combination with a bolster, of a stake, a bolt serving to pivotally connect the stake and bolster, a U-shaped holding-member straddling the end of the bolster and connected with the bolt, and a diagonal brace secured to the holding member and connected with the stake.

2. The combination with a bolster provided near its end with a recess, a stake extending into the recess, a bolt passing through the bolster and recess and pivotally connected with the stake, a U-shaped supporting member straddling the end of the bolster and pivotally connected with the bolt, an element secured to the bolster and engaging the supporting-member to hold it against movement in one direction, and a diagonal brace connected with the outer end of the U-shaped holding-member and connected with the stake.

3. The combination with a bolster provided near its end with a recess, of a removable bolt carried by the bolster and passing through the recess, a stake pivotally and removably mounted upon the bolt, a U-shaped supporting-member straddling the end of the bolster with its ends apertured to pivotally receive the bolt, a second bolt carried by the end of the bolster to support the U-shaped member, a diagonal brace pivotally mounted upon the outer end of the U-shaped member, and means to detachably connect the brace with the stake.

In testimony whereof I affix my signature in presence of two witnesses.

RICHARD R. COSTELLO.

Witnesses:
MARY ALBER,
THOS. R. GILLESPIE.

Copies of this patent may be obtained for five cents each, by addressing the "Commissioner of Patents, Washington, D. C."